Feb. 19, 1952 K. W. JARVIS 2,586,342
TRICOORDINATE RADIO DIRECTION FINDER
Filed March 3, 1948 4 Sheets-Sheet 1
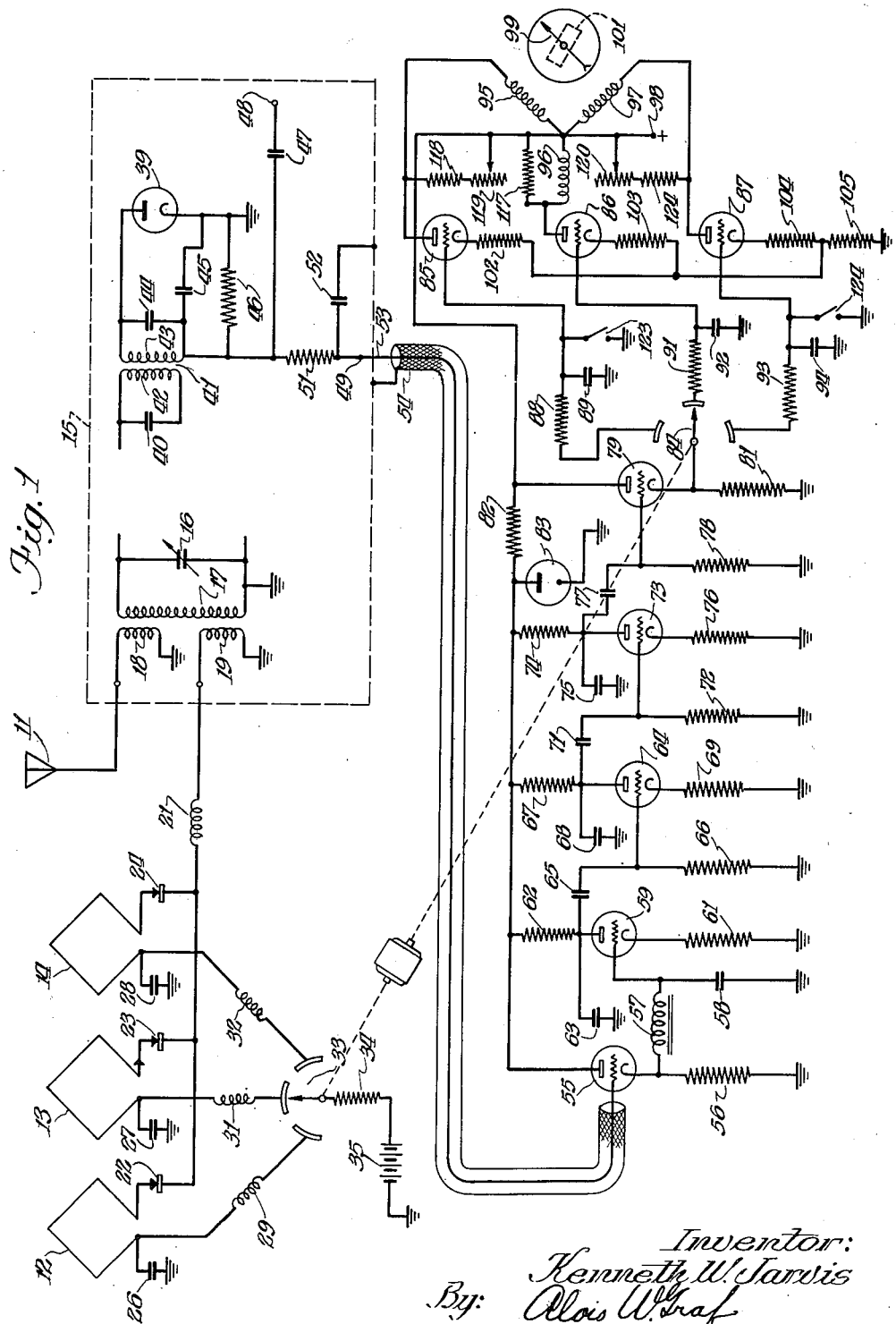
Inventor:
Kenneth W. Jarvis
By: Alois W. Graf
Attorney

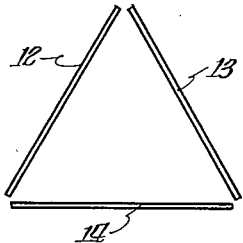
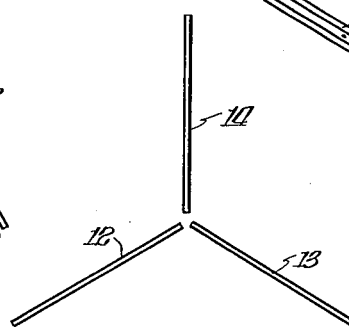
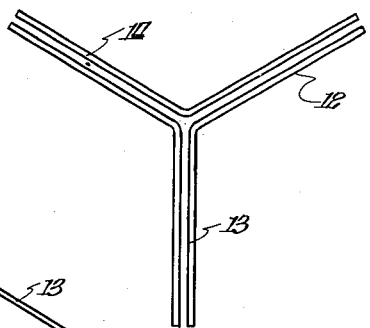
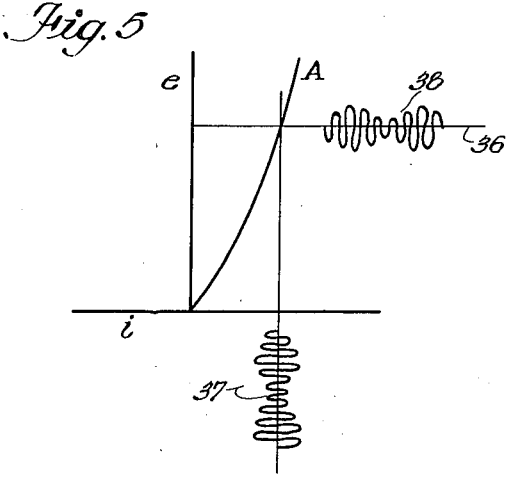
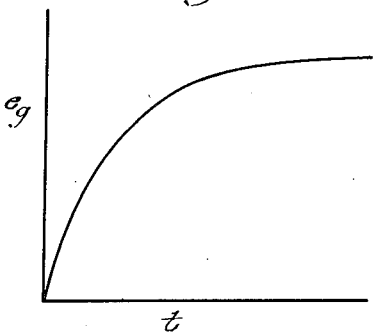
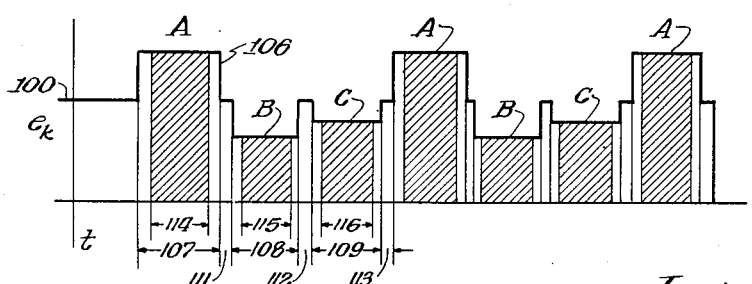

Feb. 19, 1952 K. W. JARVIS 2,586,342
TRICOORDINATE RADIO DIRECTION FINDER
Filed March 3, 1948 4 Sheets-Sheet 3
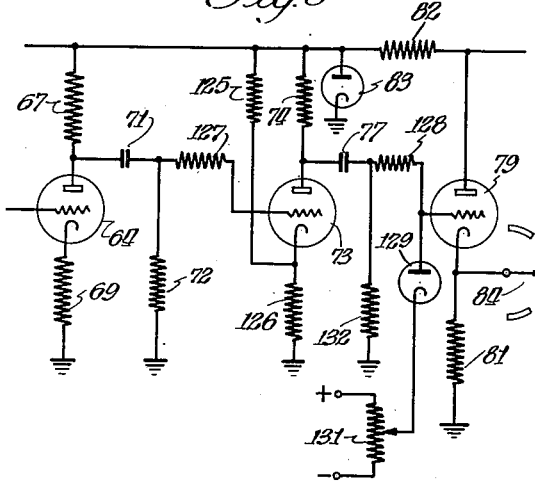
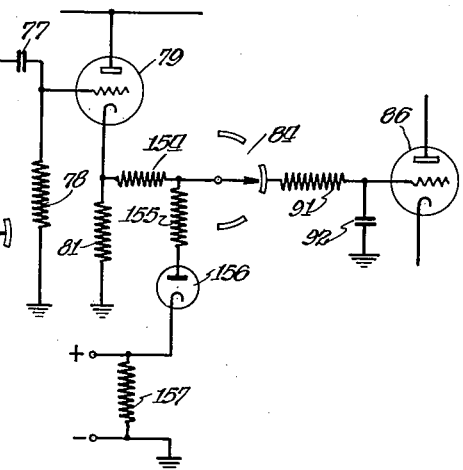
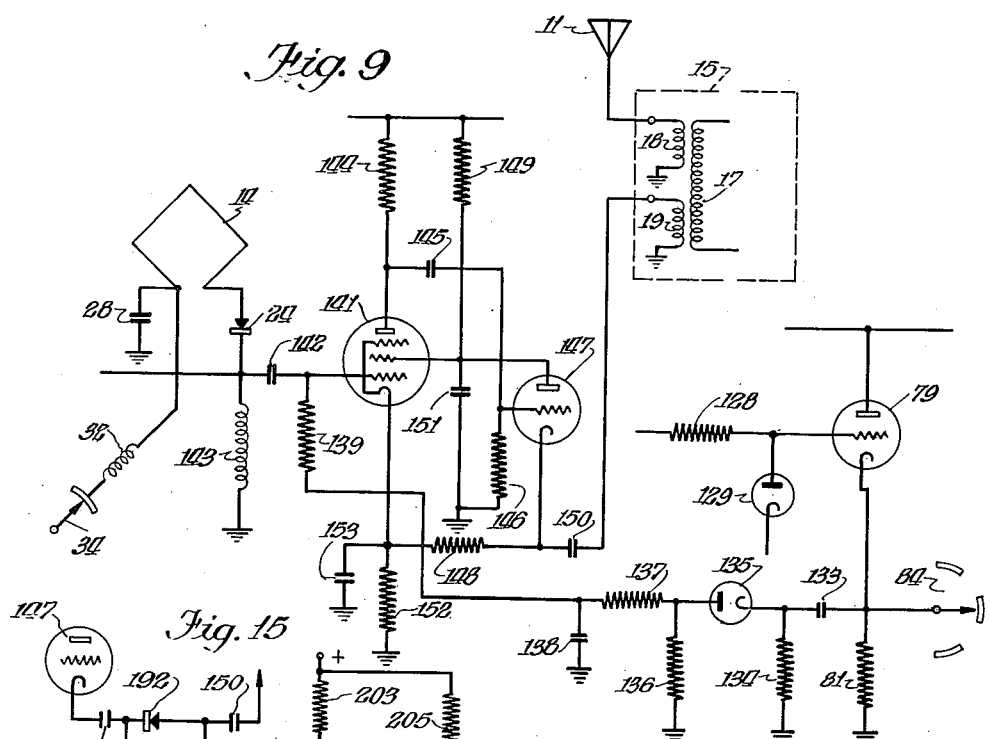
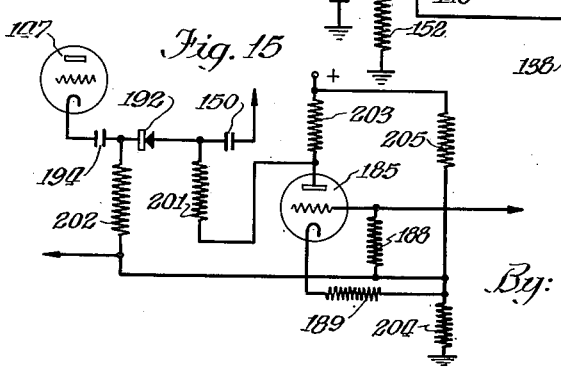
Inventor:
Kenneth W. Jarvis
Alois W. Graf
Attorney Feb. 19, 1952     K. W. JARVIS     2,586,342
TRICOORDINATE RADIO DIRECTION FINDER
Filed March 3, 1948     4 Sheets-Sheet 4
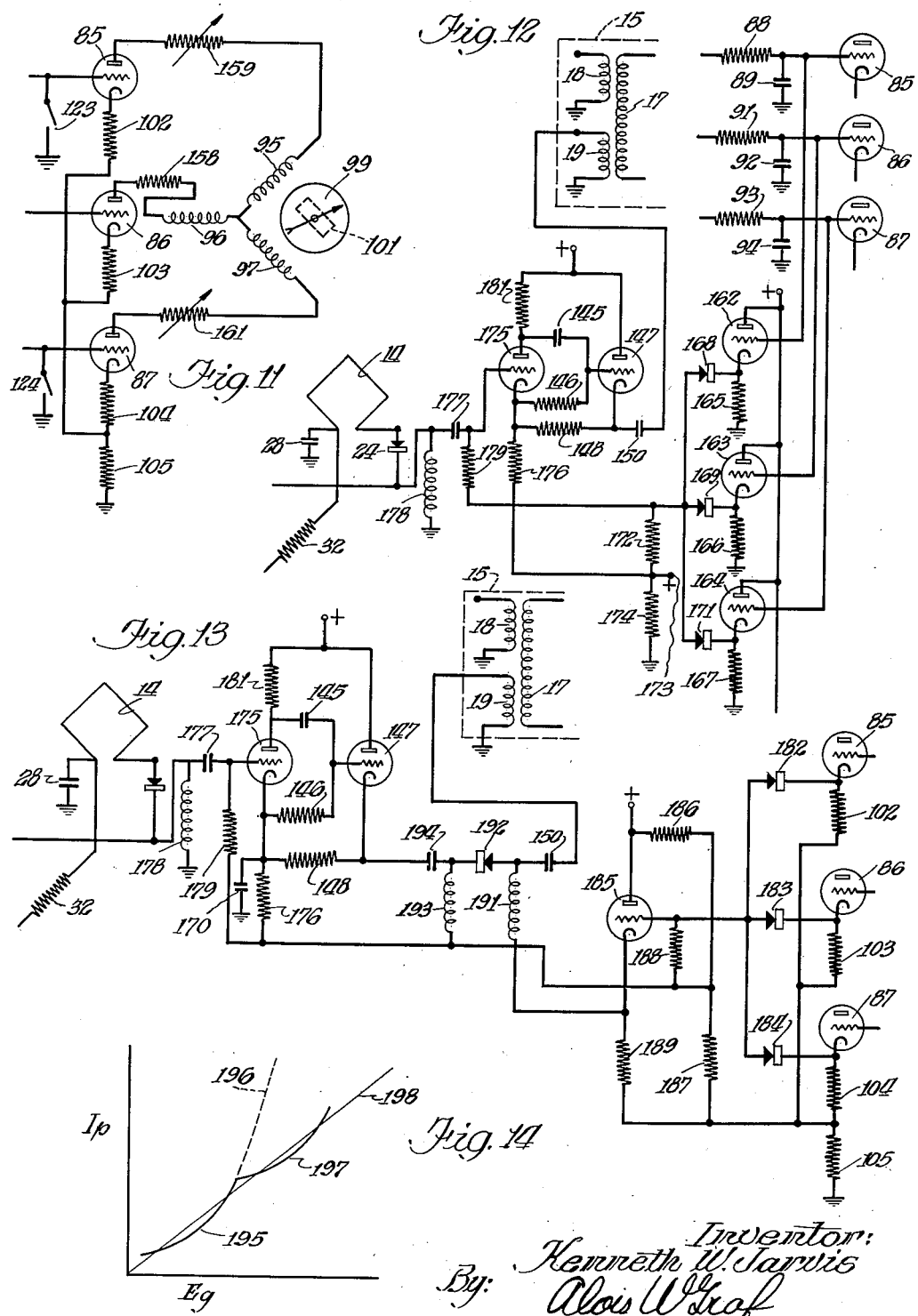

Patented Feb. 19, 1952

2,586,342

UNITED STATES PATENT OFFICE 2,586,342

TRICOORDINATE RADIO DIRECTION FINDER

Kenneth W. Jarvis, Winnetka, Ill.

Application March 3, 1948, Serial No. 12,753

36 Claims. (Cl. 343—120)

The present invention relates to direction finder, and more particularly to an improved multi-coordinate direction finding system.

It has been common to employ a loop antenna direction finder consisting of a loop antenna and a vertical antenna in order to locate the direction from which a radio signal is arriving. In such an arrangement the voltage developed by the vertical antenna is used to produce a directional sense by making the front and back responses of the loop antenna different so far as the direction finder is concerned. Such an arrangement has the disadvantage of requiring means for rotating the loop antenna to the null position. Particularly in aircraft this is usually done by a motor controlled in accordance with the resultant antenna voltage which must be sufficient to actuate the controlled mechanism if the loop antenna is to be moved within a stipulated maximum error from the null position. Near the null position, where the maximum accuracy is desired, the antenna voltage is minimum. This produces inaccuracy and "hunting." Such a motor driven arrangement necessarily employs either a slip ring or pigtail connection to the loop antenna, either of which has disadvantages at radio frequencies because of the effect produced upon the resultant antenna voltages. A rotation of the loop antenna, particularly in aircraft, also requires the use of a remote indicating system, thereby further complicating the apparatus necessary for this type of direction finder.

In order to avoid the necessity of rotating the loop antenna, it has been proposed to alternately reverse the connections of the loop antenna to the input terminals of the direction finder radio receiver. Synchronized with the commutator which reverses these connections is another commutator connected in the output circuit of the receiver to reverse the connections to an indicator. In such an arrangement the resultant indication is dependent upon the magnitudes of the voltages supplied to the input of the radio receiver. After relatively small voltage is generated by the signals received by the antenna, the contact potential variation occurring during commutation together with contact resistance variation, produces a condition which readily introduces appreciable error in the indication obtained. The reversal of the connections to the loop antenna also assumes that the reversal will produce a phase reversal of the antenna voltage, but since the input windings to the radio receiver necessarily have distributed capacity, and capacity to each other, the resultant obtained by commutation is not a true reversal of phase of 180°. In such arrangement it furthermore will be observed that other errors are introduced by the response of the loop antenna to horizontally polarized waves commonly referred to as the detrimental night effect. In systems of this type it furthermore is necessary to maintain a careful electrostatic balance to ground to avoid residual antenna effects which otherwise will distort the directional pattern of the loop antenna.

Various spaced loop direction finders also have been proposed but any advantage gained was at the expense of reduced energy pick-up and the need of even greater care in design in order to obtain and maintain symmetry, as compared with the single loop antenna design. All of such arrangements, however, still required a switching arrangement in the radio frequency circuit in order to produce a system having but a single null position. Such switching arrangements, of course, still have the disadvantage of introducing errors due to surge currents and variations in contact potential or contact resistance.

In order to obviate the difficulties encountered by switching arrangements it has been proposed to employ electronic or vacuum tube switching which, however, introduces appreciable complicated apparatus where a direction finder is to be installed in an aircraft and where the system is not to be encumbered by the 180° ambiguity of two nulls. To obviate the ambiguity and the disadvantages of mechanical switching it has been proposed to employ crossed loop antennas with separate radio frequency amplifiers for each loop antenna and also for the sense antenna. It is essential that all amplifiers must be identical and they must each produce the same phase-shift. The care required in maintaining this balance in operation together with the added bulk of so many amplifiers is of particular disadvantage where the device is to be used on aircraft.

It further is significant to note that loop antennas have low impedance whereas electronic switches have high impedance thereby producing a great loss in signal strength. It, therefore, becomes apparent that the direction finding systems heretofore provided have certain disadvantages which it is desired to overcome.

In accordance with the present invention these and other disadvantages are obviated by an arrangement resulting in an automatic direction finder system which is relatively simple in construction and operation and which avoids switching in the radio frequency circuit.

It, therefore, is an object of the present invention to provide a new and improved direction finding system.

A further object of the present invention is to provide a new and improved multi-coordinate direction finding system having no mechanical switches in the radio frequency circuit.

A further object of the present invention is to provide a new and improved multi-coordinate direction finding system having a greater sense antenna pickup than loop antenna pickup.

Another object of the present invention is to provide an improved tri-coordinate direction finding system having three loop antennas arranged in three vertical planes at equal angles to each other.

A further object of the present invention is to provide an improved direction finding system which may be employed with existing communication radio receivers.

A further object of the present invention is to provide an improved direction finding system for use with existing radio receivers to provide direction finder action while maintaining the communication services of the receiver.

A still further object of the present invention is to provide in a new and improved direction finder system an improved input system to aid direction finding purposes in existing commercial radio receivers.

A still further object of the present invention is to provide a direction finder input system for use with existing communication receivers and providing for compensation of the receiver input characteristics.

Still another object of the present invention is to provide in a direction finder system an improved output amplifier and system.

Still another object of the present invention is to provide an improved direction finder output system which limits the strength of transient modulation of the received radio wave signal.

Still another object of the present invention is to provide an improved direction finder system which automatically produces substantially correct indication at all times.

A still further object of the present invention is to provide an improved direction finder system having a commutation system wherein different periods of conductivity are provided for the input circuit as compared to the periods of conductivity of the output circuit.

Still another object of the present invention is to provide an improved direction finder output system which operates normally to cut off modulation components of the received signal carrier wave.

Still another object of the present invention is to provide an improved direction finder output system which eliminates substantially the errors normally introduced by transient or high amplitude modulation of the received signal carrier wave.

Other and further objects of the present invention subsequently will become apparent by reference to the following description taken in conjunction with the accompanying drawings wherein:

Figure 1 is a circuit diagram illustrating the present direction finder system as applied to a communications radio receiver;

Figures 2, 3 and 4 are plan view representations illustrating the orientation of the plurality of loop antennas employed in the receiver circuit of Figure 1;

Figures 5 and 6 are graphical curves illustrating certain operating characteristics of the system;

Figure 7 is a graphical representation serving to explain the manner of commutation in the input and output circuits of the direction finder system of Figure 1;

Figure 8 is a circuit diagram illustrating a modification of the circuit diagram of Figure 1 for limiting the response to noise and other disturbances thereby to obviate error normally resulting therefrom;

Figure 9 is a circuit diagram showing modifications which may be made to compensate for certain input circuit characteristics of some communication receivers;

Figure 10 is another circuit diagram illustrating the manner in which certain compensation may be applied to obtain a substantially linear response in the output circuit of the direction finder system.

Figure 11 is a circuit diagram showing a modification of Figure 1 for obtaining a balanced relation between the output tubes;

Figure 12 is a circuit diagram showing modifications which may be made to provide an improved operation for conditions where considerable random noise pulses and static are encountered;

Figure 13 shows another circuit diagram for obtaining a different type of automatic volume control for the receiver of Figure 1;

Figure 14 is a graphical representation illustrating certain compensation effects obtained by certain circuit arrangements employed in the present invention; and Figure 15 is a circuit diagram showing a modification of Figure 13.

It is well known that energy from a loop antenna and a sense antenna may be combined to provide an indication of the direction from which radio signals are being received. In such an arrangement it is common to ground one terminal of the loop and to connect the other terminal of the loop through a reactance to one of the primary windings of the input transformer of a radio receiver. The sense antenna is connected to another primary winding of the input transformer of the radio receiver. Since the induced voltage in the loop antenna is ninety electrical degrees displaced from the voltage induced in the vertical or sense antenna the phase relation between the two voltages must be shifted. Thus commonly a reactance is inserted between one connection to the loop antenna and the connection to the primary winding of the radio receiver. Such reactance commonly is an inductor although a capacitor might be employed. If the vertical antenna is physically small with respect to the wave length of the signal to be received, the response will be independent of frequency. The response of the loop antenna, which is also small with respect to the wave length of the signal to be received, is directly proportional to the frequency of the received signal. Since the reactance of the inductor in series with the loop antenna increases with frequency, this action opposes the increase in the loop pickup energy with increased frequency of the signal. Hence, the combined voltages from the loop antenna and from the sense antenna may bear a substantially constant ratio to each other which is nearly independent of the frequency being received.

The characteristics of the combined loop and sense antenna arrangements can be employed to advantage in the present direction finder system shown in the circuit diagram of Figure 1. It will be noted that a vertical or sense antenna 11 is employed with three loop antennas 12, 13 and 14. Each of the loop antennas may be in a different vertical plane where the planes are arranged at equal angles to each other as in the instance of antenna arrangements illustrated in Figures 2 and 3. In other words, the loop antennas are arranged in three vertical planes displaced from each other by equal angles. Thus, another possible configuration of the loop antenna is illustrated in Figure 4 which satisfies this requirement. Any of the physical arrangements denoted by Figures 2, 3 and 4 may be provided with a tear drop shaped outside cover to minimize wind resistance where such antennas are installed on an aircraft. Due to the absolute polar symmetry of the loop antenna system, interloop capacity coupling, which would otherwise make a crossed loop system practically inoperative, has substantially no effect on the present system.

This arrangement of loop antennas avoids polarization errors common in loop direction finders which have been given the common term of "night" effects. The bearings obtained from a single vertical loop antenna rotated about a vertical axis are correct when the signals received are vertically polarized. Horizontally polarized signals are normally produced by the action of the ionosphere which produces a greater proportion of such horizontally polarized waves at night. When a horizontally polarized component is present in the simple single vertical loop antenna, the null indicates an erroneous bearing. If only a horizontally polarized signal was being received the null position of the loop antenna would be displaced by ninety degrees.

If horizontally polarized rays or signals are received by the loop antennas 12, 13 and 14, equal voltages will be induced therein which have a resultant differential voltage equal to zero. Due to the fact that the vertical or sense antenna 11 is not responsive to horizontally polarized waves, no voltage is induced therein.

In the case of vertically polarized signal waves the voltages induced in the loop antennas 12, 13 and 14 may be represented by vectors which will have a summation of zero. The vertical or sense antenna 11, however, also receives energy having such phase relation with respect to the voltages induced in the loop antennas as to increase the vectorial representation of the voltage of a certain loop or loops and to reduce the vectorial representation in the instance of the remaining loops or loop whereby a resultant vector will lie in the direction from which the signal energy was received. It can be shown by a resolution of vectors that if the vertical or sense antenna pickup is omnidirectional and is always substantially greater than the maximum pickup of any loop in its maximum direction, that the vector summation is the exact direction from which the signal energy is arriving.

One of the features of the present invention is the fact that an automatic direction finding system may be provided which can be used with a communications receiver forming a part of the system without interfering with the normal function of the receiver. Since substantially any type of such communications receiver may be employed, this receiver has been indicated diagrammatically in Figure 1 by the dotted rectangle 15. Such receiver may have a tuned input circuit employing a variable capacitor 16 connected across the secondary winding 17 of an input transformer. The input transformer has two primary windings 18 and 19, one of which is connected to the sense antenna 11. The other primary winding 19 is connected through an inductor 21 to one terminal of each of the loop antennas 12, 13 and 14 by means of a plurality of rectifiers 22, 23 and 24. The impedance or inductor 21 is provided to produce the necessary ninety degree phaseshift between the energy supplied by the sense antenna 11 and the energy supplied by the loop antennas 12, 13 and 14. The rectifiers 22, 23 and 24 may be of any suitable type including Germanium rectifiers now readily available on the market. The remaining terminals of the loop antennas 12, 13 and 14 are connected to ground by suitable capacitors 26, 27 and 28, respectively. These same terminals of the loop antennas 12, 13 and 14 are also connected to inductors 29, 31 and 32 which in turn are connected to the various contacts of a rotary switch 33. The switch 33 may be connected through a suitable resistor 34 to one terminal of a source of potential 35 which has its other terminal grounded. The rotary switch 33 serves as a commutating means for controlling the switching of the energies picked up by the loop antennas 12, 13 and 14 so as to impress these energies in sequence upon the input circuit of the radio receiver 15. The combination of the inductor 29 with the capacitor 26 provides a filter circuit which serves to prevent transient radio frequency noises, switching transients or other impulses from being impressed upon the radio frequency input circuit associated with the loop antenna 12. In a similar manner the combination of an inductor and the corresponding capacitor for each of the other loop antennas 13 and 14 serves to produce the same effect. The switch 33 serves to apply to the various crystals 22, 23 and 24 in succession proper potential obtained from the source of potential 35 by means of a suitably selected resistor value for the resistor 34, thereby to render the corresponding crystal rectifier conductive so that the energy in the associated loop antenna may be impressed upon the input circuit of the radio receiver 15.

Figure 5 shows a curve A representing the characteristic curve of a typical one of the rectifiers 22, 23 or 24. It will be noted from the coordinates in terms of voltage against current that the rectifier begins to conduct as soon as a positive potential is applied thereto. By applying a direct current potential from the source 35 at the point 36, operation of the rectifier will be on the upper portion which is quite linear so that the rectifier operates primarily as a resistor. Thus if at the time of the application of the direct potential 33, a signal potential such as the signal 37 is applied to the rectifier, current will flow as indicated by the curve 38. Thus in effect each of the rectifiers 22, 23 and 24 operates as a switching device in the radio frequency circuit of the corresponding loop antenna. The commutating switch 33 merely applies potential to the rectifiers in sequence so that any contact resistance incurred by the switch 33 produces no substantial effect on the output of the various rectifiers and hence, no transient responses are introduced into the input circuit of the receiver 15. With proper circuit design, as is generally the case, it will be found that the equivalent resistance of each of the rectifiers at the operating point 36 is very low compared to other circuit impedances of the loop antenna, the inductor 21, or the primary winding 19. Thus changes in switch contact resistance or minor variations in the voltage of the potential source 35 are without substantial effect on the input of the radio receiver.

It may be assumed that the radio receiver 15 is of the superheterodyne type, as is commonly the case, having a second detector 39, which is in the form of a diode. The diode 39 is energized from a transformer 41 having a primary winding 42 tuned by a capacitor 40. The transformer 41 has a secondary winding 43 tuned by a capacitor 44. One terminal of the secondary winding 43 is connected to the anode of the diode 39, and the other terminal of the secondary winding 43 is connected through a bypass capacitor 45 to the cathode of the diode 39. The cathode of the diode 39 which is connected to ground is also connected through a resistor 46 to one terminal of the secondary winding 43 of the transformer 41. A rectified signal voltage is developed across the resistor 46, and by means of a coupling capacitor 47 connected to the output terminal 48, an output signal for communication purposes is obtained from the radio receiver 15. Another output terminal 49 is provided for supplying a portion of the output signal energy from the receiver 15 to the input circuit of the direction finding system. Usually the direction finding unit is located some distance from the radio receiver 15 and hence it is necessary to provide means for preventing the lead which is connected to the output terminal 49, from radiating energy. This is accomplished by providing a radio frequency filter consisting of a resistor 51 and a capacitor 52 between one terminal of the output resistor 46 and the terminal 49 and the shield or cabinet of the receiver 15. A shielded conductor 53 having a shield 54 is connected to the output terminal 49. The filter circuit comprising the resistor 51 and the capacitor 52 together with the shunt capacity of the shield 54 may also serve to prevent any radio frequency noise or signals from entering the radio receiver 15 or from reaching the direction finding unit and yet have a negligible effect on the building up of the signal voltage across the resistor 46. It is desirable to maintain both the functions of direction finding and radio reception simultaneously and mutually independent without interference. This requirement, while severe, is substantially met in the present invention by the use of a commutation rate which is substantially less than the lowest modulation frequency desired. In one practical application the switching rate was 180 R. P. M., or 3 cycles per second. Such an arrangement will produce a transmission of a series of rectangular amplitude modulation pulses which should retain their pulse shape reasonably well. In order to accomplish this it is desirable to transmit at least the fifth or seventh harmonic so that all frequencies from 3 cycles up to 20 cycles are transmitted to the direction finding unit. Another feature of the present invention is the provision of a cut-off point which is quite sharp in the region of 30 cycles, so that the normal signal modulation frequencies are removed from the pulses transmitted to the direction finding unit so that they cannot have a detrimental effect thereon.

A relatively low frequency commutation system has been found to be advantageous as compared to a system having a switching rate substantially greater than the highest modulation frequency desired. The higher switching rates produce attenuated and distorted rectangular amplitude modulation pulses due to the high selectivity of the normal radio receiver. Such distorted amplitude modulation pulses produce an improper and erroneous response in the direction finding unit.

The low frequency commutation system has a fundamental carrier amplitude modulation which is below the lower frequency of audible perception. The use of a relatively small coupling capacitor 47 will preclude the passage of harmonics until above approximately 50 cycles, when the harmonic values are low.

It has been found that the signal input level to the receiver 15 varies in accordance with the commutation of the loop antennas by the switch 33 so that the carrier level in the secondary winding 17 of the input circuit of the receiver 15 varies accordingly. This variation in signal level will produce variations in the audio frequency volume of the radio receiver 15 as observed in the output terminal 48. Thus while the output circuit of the radio receiver 15 does not produce any indication of the switching cycles or the harmonics thereof, a three cycle amplitude variation of a 1020 cycle modulation, such as the note used for aural beams of the range stations, will be observed. This disadvantage may be obviated in accordance with the present invention by utilizing an extremely small amount of loop signal energy so that the effective amplitude modulation due to the direction finding action is perhaps less than ten per cent. Commonly in radio receivers a satisfactory audio signal may be obtained with as little as 0.1 volt of rectified carrier signal appearing across the resistor 46 so that a ten per cent modulation of this signal would produce only 0.01 volt of pulse amplitude. In view of this low amplitude it, therefore, becomes necessary to provide an amplifier which is particularly suited for the amplification of a frequency range from 3 to 30 cycles per second. Such an amplifier has been shown as being connected to the conductor 53. The input 55 of this amplifier is connected in a cathode impedance or cathode follower circuit which assists in preventing the direction finding unit from effecting the second detector 39 of the receiver 15. The input tube 55 has a cathode impedance or resistor 56 across which is developed a voltage substantially equal to the voltage appearing across the output resistor 46 of the receiver 15 together with a direct current component due to the anode current of the input tube 55. A filter circuit comprising a highly effective choke 57 and a capacitor 58 tends to reject all frequencies above 30 cycles and serves to pass on to the succeeding vacuum tube 59 all frequencies below 30 cycles. Such an arrangement, therefore, tends to eliminate the normal modulation frequency component of the received signal but permits the transmission of the direction finder pulse component. The vacuum tube 59 is biased by a cathode resistor 61, and the anode is connected to an anode load resistor 62. The anode is connected to a grounded bypass capacitor 63 which further serves to reduce many of the higher radio signal modulations or other undesired frequencies. The desired low frequency direction finder pulse components are transmitted to the next vacuum tube 64 by a large coupling capacitor 65 and a grid coupling resistor 66. The anode of vacuum tube 64 is connected to an anode resistor 67 and a bypass capacitor 68. The cathode of the vacuum tube 64 is connected to a grounded cathode resistor 69. Energy from the vacuum tube 64 is fed by a large coupling capacitor 71 and a grid coupling resistor 72 to the grid of the succeeding vacuum tube 73.

The anode of the vacuum tube 73 is connected to an anode resistor 74 and a bypass capacitor 75. The cathode of the vacuum tube 73 is connected to a grounded cathode resistor 76. The output of the vacuum tube 73 is supplied through a large coupling capacitor 77 and a grid coupling resistor 78 to an output tube 79. It will be noted that the vacuum tubes 59, 64 and 73 are arranged in similar circuits and hence, it will readily be appreciated by those skilled in the art that any desired number of stages of amplification may be employed in order to produce the desired output response sufficient to operate the direction indicator with the minimum signals available, when the direction finder unit function does not interfere with the normal reception of the radio receiver 15.

The output tube 79 is connected in a cathode impedance circuit having a cathode load resistor 81. It will be noted that the stages of amplification preceding the output tube 79 are supplied from a voltage regulated source by means of the voltage drop resistor 82 and a voltage stabilizing tube 83. Thus to the left of the voltage stabilizing tube 83 the voltage supplied in the circuit to the vacuum tubes 55, 59, 64 and 73 is substantially constant.

The juncture between the cathode of the vacuum tube 79 and the cathode load resistor 81 is connected to a commutating switch 84 which is connected in sequence to the indicator tubes 85, 86 and 87. The switch 84 is connected to the vacuum tubes 85, 86 and 87 through a resistor-capacitor energy storage filter. Thus, an energy filter comprising a series resistor 88 and a bypass capacitor 89 is connected between the switch 84 and the grid of the vacuum tube 85. A similar energy storage circuit comprising the resistor 91 and the bypass capacitor 92 is inserted between the switch 84 and the grid of the vacuum tube 85. In like manner a circuit including the resistor 93 and a bypass capacitor 94 are interposed between the switch 84 and the grid of the vacuum tube 87. These energy storage circuits are provided for each of the vacuum tubes to maintain through these vacuum tubes a steady current flow so as to produce in the output circuits of the vacuum tubes a steady current flow in spite of the fact that the tubes are sequentially energized by impulses supplied through the switch 84.

The anodes of the vacuum tubes 85, 86 and 87, respectively, are connected to inductors 95, 96 and 97 having a common juncture which is connected to the anode current conductor 98. The cathodes of the vacuum tubes 85, 86 and 87 are connected respectively to self-biasing resistors 102, 103 and 104 which in turn are connected to a common bias resistor 105. The inductors 95, 96 and 97 are arranged so as to be displaced from each other by equal angles of 120 degrees. The current in the coils, therefore, will produce a net resultant magnetic field in a direction which is used to produce an indication by the pointer 99 carried by a magnet 101. It has been found that the circuit components preceding the output tube 79 introduce a certain phase displacement in the pulses received by the output tube 79 so that compensation is provided to correct this error by displacing the indicator needle 99 on the magnet 101 the necessary amount from a direction perpendicular to the longitudinal axis of the magnet 101. Due to the finite values of capacitance and resistance for such elements as capacitor 65 and resistor 66, a differentiation effect is produced which causes a certain percent of each pulse to be carried over into the next pulse. This produces the phase-shift effect which is corrected by shifting the indicator needle 99.

A significant feature of the present invention is the construction of the commutator switches 33 and 84. It has been found in practice that it is preferable to arrange the commutator switch 33 so that switch arm contacts the successive conductive segment before it leaves a conductive segment. Such an arrangement prevents the introduction of noise between contact with conductive segments since with the switch arm at a non-conductive segment or interval, a high grid impedance is obtained which results in a momentary high noise level in the loop antenna amplifier. However the switch 84 is so constructed that a non-conducting interval occurs between contact of the switch arm with a successive conductive segment. For the purpose of readily explaining the operation it is preferable to assume a non-conducting interval between each two conductive segments of the switch 33. If the commutation is so arranged that a short interval is provided between successive contacts of the rotary switch-arm of the switch 33 with the conductive segments which are connected to the inductors 29, 31 and 32, a somewhat greater interval is provided between the period when the rotary switch-arm of the switch 84 engages the conductive segments which are connected to the resistors 88, 91 and 93. The reason for this construction will become apparent by reference to Figure 7.

In that figure the instantaneous voltage $e_k$ appearing across the cathode resistor 81 of the output tube 79 is represented by the line 106. If no signals were being received by the antennas the quiescent voltage across the cathode resistor would be equal to the magnitude indicated at 100. With a cathode resistor 81 having a high value, the degeneration of the output amplifier stage which includes the vacuum tube 79 will be such that it has an almost linear input-output characteristic.

Since the coupling capacitor 77 prevents any direct current voltage from being applied to the grid of the vacuum tube 79, the average voltage $e_k$ of the varying voltage 106 will also have a value shown by the magnitude 100. Thus the sum of B plus C below the line 100 equals substantially the value of A above the line 100. The time intervals 107, 108 and 109 represent the times that the rotary switch-arm of the switch 33 is making contact with the conductive segments which are connected to the loop antennas 12, 13 and 14. The intervals 111, 112 and 113 denote the time between the conductive segments. The time intervals 114, 115 and 116 denote the times that the rotary switch-arm of the switch 84 is in contact with the conductive segments associated with the indicator tubes 85, 86 and 87. The curve 106 illustrated in Figure 7 is a theoretical curve since in actual practice it will be found that the pulse A will not have sharp corners due to the filter action of the capacitors 26, 27 and 28, together with the inductors 29, 31 and 32. In order to avoid any errors which might be introduced by any rounded corners of a pulse such as pulse A, it is desirable to utilize only that portion of the pulse which corresponds substantially to the full or complete peak response. Therefore, the time of contact of the switch 84 is made less than the time interval for the switch 33. It, therefore, may be assumed that pulses corresponding to the time interval 114 denoted by the letter A are supplied to the indicator tube 85 whereas pulses B corresponding to the time interval 115 are supplied to the indicator tube 86 and pulses C corresponding to the time interval 116 are supplied to the indicator tube 87. Since a series of pulses A are supplied to the indicator tube 85 and yet it is desired to maintain a steady flow of current through this tube proportional to the pulses A, the energy storage network comprising resistors 88 and capacitor 89 has been employed. The grid voltage on the vacuum tube 85 will follow a logarithmic charging curve shown in Figure 6. By making the time constant of the circuit including the elements 88 and 89 relatively long with respect to the rate of repetition of the switches, any such variations in the anode current of the vacuum tube 85 will not become apparent. However, it is undesirable to increase the time constant so as to make the system unduly sluggish in response. It has been found that time constants from one to five times the switching rate are most desirable.

Each indicator tube such as the tube 85 operates as a voltage control current relay. The bias resistor 102 and the resistance of the anode coil 95 both tend to straighten out the normally curved grid voltage-plate current curve. This, however, has been found insufficient since if the voltage variation of the incoming pulses doubles, the plate current change would be greater than double and hence an error in the direction indicated by the meter 99 would result. However, it becomes apparent from Figure 7 that where the voltage deviations average to a constant value of a magnitude equal to 100, the error may be substantially corrected. This correction is aided by the use of the common cathode bias resistor 105. If it is assumed now that the signal energy in the pulse A increases, a corresponding net increase in the resultant voltages of the pulses B and C will also be produced. Let it be assumed that the decreases in the voltages B and C are equal and each is equal to one-half of the increase in the voltage A. Now the tendency of the plate current of the vacuum tube 85 would be to increase faster than in proportion to the increase in the voltage A. However, the current of the other indicator tubes 86 and 87 will not decrease as rapidly as the decrease in the voltages B and C. All three plate currents of the vacuum tubes 85, 86 and 87 flow through the common bias resistor 105 so that the cathode bias of the vacuum tube 85 is increased. It will be noted that the anode currents of the vacuum tubes 86 and 87 are higher than they should be for perfect linearity and hence, the resultant common bias developed by these tubes is higher than it should be. The resultant voltage bias produced by the common bias resistor 105 has an effect on the vacuum tube 85 which is partially effective in reducing the plate current flow. Hence it becomes apparent that the effect of the common bias resistor 105 tends to improve the linearity.

In an ideal arrangement, the anode current of the three vacuum tubes 85, 86 and 87 should be equal in the absence of any signal and should have equal deviation for all equal signal changes. This can be accomplished by carefully selecting the tubes. In order to avoid, however, replacement of all of the tubes in the event that one tube requires replacement, an arrangement is provided for balancing the tubes. This is accomplished by shunting the coil 96 by a resistor 117 which has a value so as to bypass about ten per cent of the anode current of the vacuum tube 86. The coil 95 is shunted by a resistor 118 having a value such that about twenty per cent of the current would be shunted. To this resistor 118 is added an adjustable or variable resistor 119 so that by adjustment substantially the same shunting effect can be obtained. The variable resistor 119 also may be adjusted so as to substantially eliminate the shunting effect, so that the coil 95 may be provided with a range of ten per cent more to ten percent less current than the coil 96. A similar arrangement of a fixed resistor 121 and an adjustable resistor 122 are provided in shunt with the remaining coil 97. To facilitate checking whether equal currents are flowing through the coils 95, 96 and 97 a switch 123 is provided for grounding the grid of the vacuum tube 85 and a similar switch 124 is provided for grounding the grid of the vacuum tube 87. When the switch 123 is closed the grid of the vacuum tube is grounded and substantially no anode current will flow because of the voltage across the resistor 105 is nearly sufficient to produce anode current cut-off. Similarly, the closing of the switch 124 will stop nearly all anode current flow in the vacuum tube 87. With both switches 123 and 124 closed, anode current flows only in vacuum tube 86 with the result that the magnet 101 is aligned with the coil 96. The pointer 99 then may be said to be in a zero or neutral position.

It now may be assumed that switch 123 is closed, and switch 124 is open. Current will now flow in coils 96 and 97, and if they are equal, the needle 99 will be displaced from its zero position by 60 degrees. If this displacement is not obtained the necessary adjustment may be made in the contact on the adjustable resistor 120.

The switch 123 is now opened, and the switch 124 is closed so as to produce current flow in coils 95 and 96, whereupon the needle 99 should be displaced 60 degrees from the zero position in the opposite direction, or a total of 120 degrees from its previous position. The proper adjustment is now made on the contact of the adjustable resistor 119. Due to the common action of the resistor 117 it is desirable to repeat the sequence of adjustment in order to be certain to eliminate all possible error.

Another manner for compensating for differences in the vacuum tubes 85, 86 and 87 is illustrated in Figure 11. In this arrangement series resistors are employed in place of bypassing resistors such as shown in Figure 1. Thus, a resistor 158 is connected between the anode of the vacuum tube 86 and the inductor 96. This resistor 158 in one instance had a value of 1200 ohms. Variable resistors 159 and 161 were inserted between the anodes of the vacuum tubes 85 and 87 and the inductors 95 and 97, respectively. Each of the variable resistors 159 had a range from 0 to 2500 ohms. The manner in which adjustments were made in order to obtain balanced operation of the vacuum tubes 85, 86 and 87 is similar to that previously described since the switches 123 and 124 are provided for obtaining the conditions necessary for adjustment.

Heretofore, in direction finders having sequence switching or commutation, it has been assumed that the audio signal and direction finder components appearing across the diode resistor 46 of the receiver 15 were the only components present and that proper filtering action, such as here produced by the choke coil 57 and the capacitor 58, eliminated all components except the direction finder pulses A, B, and C of Figure 7. This assumption has been found to be in error. In broadcast stations or tone modulated range stations, good modulation should produce a constant carrier wave plus a variable envelope produced by the desired modulation components. In many cases, if not in practically all cases, the high level modulations used produce variations in the carrier wave itself. Thus a spoken sentence, for example, does not only have the voice frequency component but each word or syllable may produce a certain transient variation in the carrier wave. These transient occurrences which often amount to as much as twenty per cent of the carrier wave variation, appear effectively at very low frequencies and at very random frequencies. If such a transient occurrence comes at a time when the switch 84 is connected to the grid tube 85, the capacitor 89 will acquire a potential charge which will produce a change in the plate current, thus displacing the needle 99 of the indicator. The magnitude of this displacement of the needle and the duration thereof would constitute an error, dependent upon the amplitude of the transient occurrence, its duration and the possible synchronization through several cycles of successive connections of the switch 84.

It has been found that the coincidences of synchronism are, for random modulations, transient occurrences or other noises, relatively few and hence may be neglected. Since, however, the system is arranged to be responsive to as little as 0.01 volt of direction finder signal, it is necessary to make some provision for compensating the error which will be introduced when transient occurrences and random low frequency noises occur since they may have an amplitude amounting to a hundred times more than the amplitude of the direction finder pulses.

It might appear that response to such transients could be prevented by increasing the time constant of the resistor 88 and the capacitor 89. Tests, however, have been made which show this to be impractical, and this is substantiated by an examination of the shape of the curve of Figure 6.

Let it be assumed that an error of 5 per cent is permissible; then it is necessary to find the time required for the final reading of the indicator to reach 95 per cent of the correct value. From the shape of the curve in Figure 6 it is quite apparent that a small impulse acting for a short time, will produce the same error as a longer impulse acting near the fully charged position. If, for example, the transient or noise impulse has a magnitude equal to the magnitude of the direction finder pulse and lasts for one-tenth second, which is approximately equal to the time interval 114 on Figure 7, the same error will be introduced as if the curve in Figure 7 reached 95 per cent of its value in five seconds. If, however, it is desired to produce only the same error with an impulse or transient noise disturbance having an amplitude fifty times as great as the direction finder pulse, the indicator 99 would not reach 95 per cent of its final value for almost four and one half minutes. It, therefore, is apparent that the conventional solution of greater delay time is not applicable to the present instance.

The practical solution is to permit a small amount of error such as has been indicated as being permissible and limiting the amplitude of transient occurrences and noise impulses to substantially that of the direction finder pulses. With only small amounts of error thus permitted in the deviations of the needle 99, it will be found the error will be at random and generally about the correct direction of indication. A desirable time constant would be within the range from one-half to ten times the switching or commutating rate.

A suitable arrangement for limiting the amplitude of the transient disturbances or noise impulses, to substantially the amplitude of the direction finder pulses, is shown in Figure 8 wherein components corresponding to those shown in Figure 1 have been given corresponding reference characters. A circuit arrangement including a voltage drop resistor 125 and a cathode bias resistor 126 is provided for maintaining substantially constant the cathode bias voltage of vacuum tube 73. These voltages are selected so that the voltage variation on the grid of vacuum tube 73 is held in a range between zero and a point which produces anode current cutoff. The grid of the vacuum tube 73 is connected through a resistor 127 to the coupling capacitor 71 of the preceding stage of amplification. Any tendency to increase the voltage of the grid of the vacuum tube 73 above zero bias produces a grid current flow through the resistor 127 which effectively prevents the grid voltage from rising appreciably above the zero voltage limit. This arrangement, therefore, limits the peak of the transient or noise impulses of one polarity whereas the peaks of opposite polarities are limited in the succeeding stage. This is accomplished because of the phase reversal action of the amplifier tube 73. Since, however, the final amplifier tube 79 is connected in a circuit as a cathode impedance device a different circuit arrangement is employed for producing the limiting action.

A resistor 128 is connected between the coupling capacitor 77 and the grid of the vacuum tube 79. A diode 129 is connected between the grid of the vacuum tube 79 and to a desired position on a resistor 131 which is connected across a suitable source of potential. The juncture between the coupling capacitor 77 and the grid resistor 128 is connected to a grounded grid leak resistor 132.

If the grid potential of the vacuum tube 79 increases above a value equal to the bias potential obtained from the source 131, current will flow through the grid resistor 128, thus to produce a limiting action to preclude further rise in grid voltage.

By selecting the components added to the circuit arrangement in Figure 8 so as to produce a limiting action just above the voltage required for proper operation on the indicator 99 no effect is produced on the normal direction finder signal pulses. The limiting action produced is effective to substantially eliminate any observed error due to noise impulses and similar transient disturbances. The arrangement has been found effective to eliminate the effect of such impulses as those caused by lightning which in the past have been known to introduce such error into direction finders as to cause them to indicate the direction of the center of the storm instead of the desired radio station.

In connection with the circuit arrangement shown in Figure 1 it was pointed out how the inductor 21 was introduced in order to produce the proper phase relation between the voltage supplied by the sense antenna 11 and the voltages supplied by the loop antennas 12, 13 and 14. This not only produced the proper phase shift but also held substantially constant the voltage ratio between the sense antenna voltage and the loop antenna voltage.

It has been pointed out that the present system is applicable to use with existing radio receivers. In certain of the radio receivers, however, an arrangement is provided in order to obtain the desired gain versus frequency or other tracking characteristics of the tuning capacitor which results in a relatively large primary input transformer coil loosely coupled to a secondary coil. Electrically such an arrangement is equivalent to having a large series inductance coil in the antenna lead with an equivalent small coil having close coupling to the secondary coil. This produces a phase shift of substantially 90 degrees in the antenna circuit. Thus a correct phase addition of the loop antenna and sense antenna voltages is obtained without the use of the auxiliary inductor 21. In such an arrangement the sense antenna input voltage decreases with an increase in frequency while the loop antenna input voltage increases with an increase in frequency. In covering a wide frequency range with such an arrangement the ratio of the two voltages to each other will deviate excessively from a desired value.

In most cases the two primary windings of the input transformer of the receiver also have some capacity coupling to the secondary winding as well as the inductive coupling relationship. Circuits might be designed to compensate for the variation in the ratio of the two voltages of the two antennas but this would require a different compensation system for each model of such radio receiver, and the compensation system undoubtedly would be extremely complex.

An arrangement which obviates the necessity for individual compensation systems is shown in the circuit arrangement of Figure 9. To simplify the explanation, those components in Figure 9 which correspond to the components shown in the circuit diagram of Figure 1 have been given similar reference characters. For the proper operation of the direction finding system it is necessary to produce a certain desired output voltage across the resistor 81. This voltage may vary over a range of perhaps five to one and yet remain within the linear compensation range to be described. In order to hold the voltage developed across this output resistor 81 within the range mentioned, a loop amplifier is provided having a gain which is controlled by the magnitude of the final developed direction finder pulse voltage. In order to remove the direct current component of this pulse voltage a coupling capacitor 133 is connected to one end of a grounded resistor 134. The juncture between the capacitor 133 and the resistor 134 is connected to the cathode of a diode vacuum tube 135. The negative components of the voltage pulses appearing across the resistor 134 are transmitted by the diode 135 so as to appear across a resistor 136 connected between ground and the anode of the diode 135. An alternating current pulse filter comprising a resistor 137 connected to the resistor 136 and a capacitor 138 connected to ground serve to impress a substantially pure direct current voltage upon a grid resistor 139 on a pentode vacuum tube 141 having a sharp cut-off characteristic. The grid of the vacuum tube 141 is connected through a coupling capacitor 142 to the common conductor which leads to the various crystal rectifiers such as the crystal rectifier 24 associated with the loop antenna 14. In order to provide a complete circuit for the loop antenna with respect to ground the juncture between the capacitor 142 and the crystal rectifiers is connected to a grounded inductor 143.

The pulses of loop antenna energy obtained from the loop antennas 12, 13 and 14 are impressed through the coupling capacitor 142 upon the grid of the vacuum tube 141. The amplified radio frequency pulse appears across the anode resistor 144 which thereupon is impressed by a coupling capacitor 145 and a grid leak resistor 146 upon the grid of a vacuum tube 147. Since the impedance of the primary winding 19 of the receiver 15 usually is low it is desirable to supply energy thereto from a low impedance source and hence, the vacuum tube 147 is connected in a cathode impedance circuit including the cathode resistor 148. Suitable anode potential for the vacuum tube 147 and screen grid voltage for the vacuum tube 141 are obtained from the anode voltage source by a voltage drop resistor 149 which is provided with a grounded bypass capacitor 151. The cathode of the vacuum tube 141 is provided with a self-biasing resistor 152 which is provided with a grounded bypass capacitor 153. It will be noted that the resistor 152 is also common to the cathode circuit of the amplifier tube 147. A coupling capacitor 150 interconnects the resistor 148 and the input winding 19 of the receiver 15.

An increase in the pulse voltage appearing across the output resistor 81 of the vacuum tube 79 produces an increase in the automatic volume control voltage which is supplied to the grid of the vacuum tube 141 thereby to decrease the plate current thereof. The decrease of the anode current of the vacuum tube 141 produces a decrease in the voltage drop across the resistor 152 thereby to increase the current flow through the vacuum tube 147. This increased current flow through the vacuum tube 147 increases the voltage drop across the resistor 149 which thereby lowers the screen grid voltage of the vacuum tube 141 or in other cases holds substantially constant the screen grid voltage of the vacuum tube 141. The gain of the vacuum tube 141 therefore is decreased faster than would be the case if the screen grid voltage were allowed to rise with an increase in the automatic volume control voltage. With such an arrangement an exceedingly flat over-all characteristic is obtained even though only one tube is controlled by the automatic volume control voltage so that compensation is substantially provided for all variations in the coupling ratios between the primary coils 18 and 19 of the receiver 15, thus maintaining the pulse voltage appearing across the output resistor 81 within the desired limits. The arrangement shown in Figure 9 therefore operates to reduce the loop antenna voltage introduced into the receiver 15 to the minimum possible value which will still give the necessary direction finder pulse output voltage to control the indicator. Due to the high gain of the direction finder pulse amplifier, the direction finder pulse voltage appearing across the detector resistor 46 of Figure 1 is relatively low and substantially constant. Thus, irrespective of the absolute magnitude or variations in the loop antenna and sense antenna voltages, the sensitivity to which the receiver is adjusted, minor mistuning of the receiver, voltage variations in the power supply, the system still operates to obtain at all times a minimum of signal interference due to the operation of the direction finder unit.

It will be recalled that in connection with the description of the circuit arrangement shown in Figure 1 it was stated that the vacuum tubes 85, 86 and 87 were utilized as voltage control current relays wherein the cathode resistors and the resistances of the plate or anode current coils tended to straighten out the normally curved grid voltage-plate current characteristic. Since the voltage variation however tended to approach the constant value of a magnitude of 100 on Figure 7, the error was at least partially corrected. If desired, an arrangement may be employed which further produces a correction for this curved grid voltage-plate current characteristic of the vacuum tubes 85, 86 and 87 as well as for the minor effect of the grid voltage-plate current characteristic of the output tube 79. Such an arrangement is illustrated in Figure 10 wherein a circuit is introduced between the switch 84 and the cathode impedance resistor 81. This circuit includes a resistor 154 connected between the cathode of the vacuum tube 79 and the switch or commutator 84. Another resistor 155 is connected between the switch 84 and the anode of a diode vacuum tube 156 which has its cathode connected to the positive terminal of a source of potential appearing across a resistor 157 which has one terminal grounded. If the voltage appearing across the resistor 81 is such as to apply a negative potential to the capacitor 92 of the vacuum tube 86, the voltage applied to the anode of the diode 156 is also negative so that this circuit has no effect on the potential supplied to the grid of the vacuum tube 86. If, however, the voltage appearing across the resistor 81 is in a positive direction, and more positive than the voltage across resistor 157 a positive potential will be applied to the anode of the diode 156 which begins to conduct gradually, thereby to reduce by a certain percentage the voltage impressed upon the capacitor 92 and upon the grid of the vacuum tube 86. By suitable calculation from a desired mean voltage appearing across the resistor 81, the values of the resistors 154, 155, and the potential value across the source 157 may be so selected that for certain positive potentials the diode rectifier tube 156 will serve to decrease the potential by as much as twenty per cent. This is sufficient to make the resultant operation of the various vacuum tubes 85, 86 and 87 such that they would appear to have a substantially linear grid voltage-plate current characteristic.

The effect of this operation is illustrated in Figure 14 which shows that the lower portion of the grid voltage plate's current characteristics 195 is substantially straight whereas the upper portion shown in dotted line 196 deviates considerably from a straight line such as the line 198. By reducing by a certain percentage the voltage impressed upon the capacitor 92 and upon the grid of the vacuum tube 86, the curve 197 is produced which again lies close to a true straight line 198. It is apparent that this mode of operation may be extended still further if it is desired to obtain a substantially straight line longer than the curved portions 195 and 197.

Previously mention was made of the fact that random noises, pulses due to carrier variation, static, lightning and the like, would pass through the amplifier with an amplitude which is determined by the limiter action. Such disturbances would produce a voltage across the resistor 81 of Figures 1 and 9 and would thus aid in developing an automatic volume control voltage across the resistor 136. The voltage developed across the resistor 136 would serve to reduce the gain of the loop antenna amplifier which in certain severe cases of noise conditions might be sufficiently great as to be undesirable. For such locations subject to severe noise disturbances an arrangement such as shown in Figure 12 may be employed.

A plurality of vacuum tubes 162, 163 and 164 are arranged with their control grids connected to the grids of the output tubes 85, 86 and 87, respectively. The vacuum tubes 162, 163 and 164 are provided with cathode resistors 165, 166 and 167, respectively across which direct current voltages will be developed corresponding to the voltages impressed upon the control grids of the vacuum tubes 85, 86 and 87. The voltages appearing across these cathode resistors will be higher and lower than the average voltage across the resistor 81 due to the polarity of the pulse voltages impressed upon the grids of the corresponding tubes. Connected to the cathodes of the vacuum tubes 163, 164 and 165 are diodes 168, 169 and 171, respectively. These diodes are all connected to one terminal of a resistor 172 which has its other terminal connected to a terminal 173 which is connected to the positive side of a source of potential. The terminal 173 is connected to one terminal of a resistor 174 which has its other terminal connected to ground.

With the diodes connected as shown, the cathode resistor having the lowest potential will cause the greatest conductivity of its associated diode so that the potential appearing across the resistor 172 will equal the potential across that cathode resistor. Thus, the load resistor 172 has a potential equal to the least positive or lowest voltage appearing across any of the cathode resistors.

A vacuum tube, 175, which may be a triode, has its cathode connected to a resistor 176, which in turn is connected to the common juncture between the resistors 172 and 174. The common juncture between these resistors is maintained at a positive potential by virtue of the connection 173. This positive potential is so selected as to be slightly less positive than the no-signal potential of the cathodes of the vacuum tubes 162, 163 and 164.

Thus if sufficient pulse signal is obtained to properly operate the vacuum tubes 85, 86 and 87, a negative potential will be developed across the resistor 172 which will serve to lower the gain of the amplifier tube 175. The grid of the amplifier tube 175 is coupled by a capacitor 177 to the loop antennas 12, 13 and 14. In order to provide for a complete circuit for the application of the potential source 35 of Figure 1 to the various diodes 22, 23 and 24, an inductor 178 is connected between ground and one side of the capacitor 177. The grid of the vacuum tube 175 is connected through a resistor 179 to one terminal of the resistor 172. It will be noted that the inductor 178 corresponds to the inductor 143 of Figure 9; that the coupling capacitor 177 corresponds to the coupling capacitor 142; and the grid resistor 179 corresponds to the resistor 139 of that figure. The anode of the vacuum tube 175 is connected through a resistor 181 to a suitable source of potential. The resistor 181 corresponds to the resistor 144 of the arrangement shown in Figure 9. The vacuum tube 175 is associated with a vacuum tube 147 having its grid coupled by a capacitor 145 to the anode of the vacuum tube 175. The resistor 148 interconnects the cathodes of the vacuum tubes 175 and 147. The cathode of the vacuum tube 147 is connected by a capacitor 150 to the input terminal 19 of the radio receiver 15. By means of this arrangement an automatic volume control voltage is developed which, due to the filtering and averaging of random pulses accomplished by the resistor capacitor combinations such as resistors 88, 91 and 93 respectively and the capacitors 89, 92 and 94, respectively, is a function of the pulse signal only, and is undetermined by random noise or transient disturbances.

When the receiver is tuned to weak or distant radio stations, the gain of the receiver may be quite high. Under such conditions even though automatic volume control is provided for, the tube noise introduced by the loop antenna amplifier may be higher than desirable. To overcome such conditions of operation modifications may be introduced in accordance with circuit arrangement illustrated in Figure 13.

In this arrangement the voltage change appearing across any of the cathode resistors 102, 103 and 104 of the outlet tubes 85, 86 and 87 is used to obtain the automatic volume control action instead of employing a separate tube as was done in the circuit shown in Figure 12. Three diodes 182, 183 and 184 are connected to the cathodes on the vacuum tubes 85, 86 and 87 respectively, to provide an arrangement for determining and obtaining the most negative voltage appearing across the cathode resistors. A vacuum tube 185 is arranged to be responsive to this voltage and it has its anode connected to a suitable source of positive potential. From the source of positive potential there is arranged a resistor 186 which is connected to a resistor 187 which in turn is connected to the juncture between the resistors 104 and 105. The resistors 186 and 187 therefore, constitute a bleeder circuit so that the common juncture between the two resistors establishes a point of positive reference potential. The various diodes 182, 183 and 184 are all connected to the grid of the vacuum tube 185 and to a grid resistor 188 which in turn is connected to the common juncture between the resistors 186 and 187. The cathode of the vacuum tube 185 is provided with a cathode resistor 189 which also is connected to the juncture between the resistors 104 and 105. When any of the cathode resistors 102, 103 or 104 develops a potential which is negative relative to the potentials of the other resistors, a negative potential is likewise developed across the resistor 188 which tends to decrease the current through the vacuum tube 185. A choke conductor 191 is connected to a diode 192 which in turn is connected to a choke inductor 193. Current flowing through the vacuum tube 185 produces a flow of current through the choke conductor 191 which is connected to the cathode of the vacuum tube 185. The inductor 193 is connected to a common juncture between the resistors 186 and 187 and also to the grid resistor 188. As the bias potential appearing across the resistor 188 changes, a corresponding change in current through the diode 192 produces a substantial resistance change of the diode. The vacuum tube 147 has its cathode connected by the coupling capacitor 194 and the diode 192 and the capacitor 150 to the input terminal 19 of the receiver 15. By a variation of the current flow through the diode 192, different operating points on the curve shown in Figure 5 are obtained. The diode 192 varies in resistance from a relatively low value of approximately 50 ohms to a very high value of the order of one half million ohms. Thus an over-all volume control system is obtained which has an extremely flat characteristic. This produces an action where the loop antenna amplifier signal is always reduced to the minimum necessary for proper operation and any noise developed in the amplifier tube is likewise reduced in proportion. The use of the resistor 189 is such that it forms a bridge circuit with the resistors 186, 187 and the anode resistance of the vacuum tube 185. By the use of such circuit arrangement, the voltage appearing across the diode 192 not only may be brought to zero but may actually be reversed to ensure a sharp and complete cut-off of the amplification of the amplifier tubes.

In the circuit illustrated in Figure 13 the circuit including the diode rectifier 192 was connected to the cathode of the vacuum tube 185. In another embodiment it was found that the diode 192 could be employed in a slightly different circuit and that it could be connected to the anode of the vacuum tube 185. Accordingly, in Figure 15 it will be noted that the inductors 191 and 193 have been replaced by resistors 201 and 202. The resistor 201 therefore is connected between the anode of the vacuum tube 185 and the diode 192. The resistor 202 is connected between the other side of the diode 192 and the cathode resistor of the vacuum tubes 175 and 147. This resistor furthermore is connected to the juncture between the series resistors 204 and 205 which are connected between ground and a source of positive potential such as the source of anode potential for the vacuum tube 185. A resistor 203 is interposed between the anode of the vacuum tube 185 and the source of positive anode potential. The grid together with its grid resistor 188 is connected to the common juncture leading to the diodes 182, 183 and 184 of Figure 13.

An analysis of the circuit modification shown in Figure 15 will show that a bridge circuit is again obtained wherein the four legs of the bridge consist of resistors 203, 205, 204 and the fourth leg of the bridge consists of the impedance of the vacuum tube 185 together with its cathode resistor 189. The juncture between this latter leg and the resistor 204 is connected to ground whereas the juncture between the resistors 203 and 205 is connected to the positive source of potential. Connected across the other diagonal of the bridge is a circuit comprising the resistor 202, the diode 192 and the resistor 201. From this it will be apparent to those skilled in the art that the operation is similar to the mode of operation described in conjunction with the circuit arrangement in Figure 13.

While for the purpose of illustrating and describing the present invention, certain preferred embodiments have been shown in the circuit diagrams of the drawings, it is to be understood that the invention is not to be limited thereby since such variations in the components employed and in their circuit arrangements are contemplated as may be commensurate with the spirit and scope of the invention set forth in the accompanying claims.

What I desire to protect by United States Letters Patent is claimed as follows:

1. A radio direction finding system comprising a plurality of loop antennas arranged in polar symmetry and a sense antenna, periodically conductive means for sequentially combining energy from said loop antennas and said sense antenna, including a source of direct current potential and a plurality of diodes each associated with a different one of said loop antennas and arranged to be rendered conductive by application of said direct current potential thereto, an amplifier for said combined energy, and a polyphase indicating instrument energized from said amplifier.

2. A radio direction finding system comprising a sense antenna and at least three loop antennas arranged in polar symmetry so as to have no resultant response to horizontally polarized signal components, means periodically conductive at intervals for sequentially combining energy from said loop antennas and said sense antenna, an amplifier for said combined energy, an indicating instrument have a plurality of energizing windings corresponding in number to the number of loop antennas and being arranged in polar symmetry, energy storage means connected to said instrument, and means for sequentially supplying said energy storage means with energy from said amplifier for intervals of shorter duration than the times of combining energy from said loop antennas with energy from said sense antenna.

3. A radio direction finding system comprising a sense antenna and at least three loop antennas, an amplifier, a normally non-conductive unilaterally conductive device interposed between each loop antenna and said amplifier, commutating means arranged to render conductive said devices in sequence for combining in sequence the energy of each loop antenna with said sense antenna, a polyphase indicating instrument, and commutating means interconnecting said indicating instrument with said amplifer.

4. A radio direction finding system comprising a sense antenna and at least three loop antennas arranged in polar symmetry, an amplifier, a diode interposed between each loop antenna and said amplifier, a source of direct current potential, mechanical commutating means interconnecting said source of direct current potential with said diode for combining in sequence the energy of each loop antenna with energy from said sense antenna, a polyphase indicating instrument, and mechanical commutating means interconnecting said indicating instrument with said amplifier.

5. A radio direction finding system comprising a plurality of loop antennas arranged in polar symmetry and a sense antenna, means for sequentially combining signal energies from said loop antennas with that of said sense antenna, a communication receiver energized by said combined energies, said receiver having a detector, a direction finder amplifier, means for supplying a portion of the signals from said detector to said direction finder amplifier, means for limiting said portion of said signals to eliminate substantially the communication signal modulation frequency, and means for supplying said limited signal energy to a polyphase indicating instrument.

6. A radio direction finder system comprising a plurality of loop antennas arranged in polar symmetry and a sense antenna, means for sequentially combining signal energy from each loop antenna with that of said sense antenna, a communication receiver energized by said combined energies, said receiver having a detector, a direction finder amplifier, means for supplying a portion of the signals from said detector to said direction finder amplifier, means for modifying said portion of said signals to produce sub-audible signal pulses, a circuit including a polyphase indicating instrument, and means for sequentially supplying said sub-audible signal pulses to said circuit.

7. A radio direction finder system comprising a plurality of loop antennas arranged in polar symmetry and a sense antenna, means for sequentially combining signal energies from each loop antenna with that of said sense antenna, a communication receiver energized by said combined energies, said receiver having a detector, a direction finder amplifier, means for supplying a portion of the signals from said detector to said direction finder amplifier, means for limiting and filtering said portion of said signals to eliminate substantially the communication signal modulation frequency, means to produce signal pulses of different amplitudes, a polyphase indicating instrument having a plurality of windings, and means for sequentially supplying energy proportional to said limited and filtered signal pulses to the windings of said indicating instrument.

8. A radio direction finder system comprising a plurality of loop antennas arranged in polar symmetry and a sense antenna, commutating means for sequentially combining signal energy from each loop antenna with that of said sense antenna, a detector for said combined energies, an amplifier, means for supplying a portion of the signals from said detector to said amplifier, means for limiting and filtering said portion of said signals to produce signal pulses of sub-audible frequencies having amplitudes proportional to the said combined antenna energies, an indicating instrument having a plurality of windings corresponding in number to the number of loop antennas, and a second commutating means synchronized with said first commutating means for supplying energy from said signal pulses to said plurality of windings of said indicating instrument.

9. A radio direction finder system comprising a plurality of loop antennas arranged in polar symmetry and a sense antenna, means for sequentially combining signal energy from each of said loop antennas with said sense antenna, a communication receiver having a detector, said receiver being energized with said combined signal energies, means for obtaining from said receiver detector a portion of the detected signals, means for modifying said portion of said signals to produce sub-audible pulses having amplitudes proportional to the magnitudes of said combined antenna signal energies, means for producing substantially linear amplification of said pulses, a circuit including an integrating indicating instrument, and means for sequentially supplying said pulses to said circuit to energize said indicating instrument to produce a resultant indicative of the direction from which signal energies are being received.

10. A radio direction finder system comprising a plurality of loop antennas arranged in polar symmetry and a sense antenna, means for sequentially combining signal energy from each of said loop antennas with said sense antenna, said means operating at a sub-audible frequency, a communication receiver having a detector, said receiver being energized with said combined signal energies, means for obtaining from said receiver detector a portion of the detected signals, means for modifying said portion of said signals to produce sub-audible pulses having amplitudes proportional to the magnitudes of said combined antenna signal energies, means for producing substantially linear amplification of said pulses, an integrating indicating instrument, energy storage means associated with said instrument, a means for sequentially supplying said pulses to the energy storage means associated with said indicating instrument to produce a resultant indicative of the direction from which signal energies are being received.

11. A radio direction finder system comprising a plurality of loop antennas arranged in polar symmetry and a sense antenna, means for sequentially combining signal energy from each of said loop antennas with said sense antenna, a detector, said detector being energized by said combined sense and loop antenna energies, means for obtaining from said detector a portion of said signals, means for modifying said portion of said signals to produce pulses having amplitudes proportional to the combined antenna signal energies, means for eliminating the effect of transient variations in said pulses, an indicating instrument, and means for sequentially supplying energy from said pulses to said indicating instrument.

12. In a radio direction finder, the combination comprising a plurality of loop antennas and a sense antenna, means for sequentially combining the energy of each loop antenna with that of said sense antenna, a receiver energized by said combined energies, an amplifier interposed between said loop antennas and said receiver, means for producing from said receiver low frequency pulses having amplitudes proportional to the magnitudes of the combined antenna energies, a polyphase indicating system including a plurality of tubes arranged to be energized by said pulses in a sequence corresponding to the sequence of combining said antenna energies, means for developing from said plurality of tubes an automatic volume control voltage proportional to the pulse signal only for controlling the gain of said amplifier.

13. In a radio direction finder, the combination comprising a plurality of loop antennas and a sense antenna, means for sequentially combining the signal energy of each loop antenna with that of said sense antenna, an amplifier and a detector energized by said combined signal energies, an auxiliary amplifier interposed between said loop antennas and said amplifier, means for producing from said detector low frequency pulses having amplitudes proportional to the magnitudes of the combined antenna signal energies, a polyphase indicating system including a plurality of tubes corresponding in number to the number of loop antennas and energized by said pulses in a sequence corresponding to the sequence of combining said antenna energies, means for developing from the lowest pulse signal input of said plurality of tubes an automatic volume control voltage proportional to the pulse signal for controlling the gain of said auxiliary amplifier.

14. In a radio direction finder, the combination comprising a plurality of loop antennas and a sense antenna, means for sequentially combining the signal energy of each loop antenna with that of said sense antenna, an amplifier and a detector energized by said combined signal energies, a vacuum tube interposed between said loop antennas and said amplifier, means for producing from said detector low frequency pulses having amplitudes proportional to the magnitudes of the combined antenna signal energies, a polyphase indicating system including a plurality of energy storage circuits corresponding in number to the number of loop antennas and energized in sequence corresponding to the sequence of combining said antenna signal energies, means for developing from the lowest signal input to said energy storage circuits an automatic volume control voltage proportional to the pulse signal for controlling the gain of said vacuum tube.

15. A radio direction finder system comprising a plurality of directional antennas arranged in polar symmetry and a non-directional antenna, means for sequentially combining the signal energy of each directional antenna with that of said non-directional antenna, an amplifier energized by said combined energies, a means for producing from the output of said amplifier generally rectangularly shaped pulses having amplitudes proportional to the magnitudes of the signal energies of said directional antennas, and an indicating instrument arranged to produce an indication of the resultant of said pulses.

16. A radio direction finder system comprising a plurality of directional antennas arranged to produce a resultant response only to vertically polarized signal waves and a non-directional antenna, means for sequentially combining the signal energy of each directional antenna with that of said non-directional antenna at a rate less than fifty cycles per second, an amplifier energized by said combined energies, means for producing from the output of said amplifier pulses having amplitudes proportional to the magnitudes of said combined antenna signal energies, an indicating instrument, and means for supplying said indicating instrument with energy from said pulses to produce an indication of the resultant of said pulses.

17. A radio direction finder system comprising a plurality of directional antennas arranged in polar symmetry and a non-directional sense antenna, a communication receiver arranged to be energized by said sense antenna and sequentially by each of said directional antennas, an amplifier interposed between said receiver and said directional antennas, said amplifier including a tube having a sharp cut-off characteristic, said tube having a screen grid connected to a source of voltage, means connected to said receiver for producing a volume control voltage in accordance with the average amplitude of said combined antenna energies, means for applying said volume control voltage to said tube having said sharp cut-off characteristic, and means responsive to the action of said volume control voltage for varying the voltage of said screen grid to provide a relatively flat over-all amplification characteristic for said tube.

18. A radio direction finder system comprising a plurality of directional antennas arranged in polar symmetry and a non-directional sense antenna, a communication receiver arranged to be energized by said sense antenna and sequentially by each of said directional antennas, an amplifier interposed between said receiver and said directional antennas, said amplifier including a tube having a sharp cut-off characteristic, means connected to said receiver for producing a volume control voltage in accordance with the peak variation in amplitude of said combined antenna energies, and means for applying said volume control voltage to said amplifier tube.

19. A radio direction finder system comprising a plurality of directional antennas arranged in polar symmetry and a non-directional sense antenna, a communication receiver arranged to be energized by said sense antenna and sequentially by each of said directional antennas, an amplifier tube interposed between said receiver and said directional antennas, and comprising a tube having a sharp cut-off characteristic, said tube having a screen grid connected to the positive side of a source of voltage, means connected to the output of said receiver for producing a volume control voltage in accordance with said directional antenna energies, means for applying said volume control voltage to control the amplification of said tube, and means responsive to the action of said volume control voltage for varying the voltage of said screen grid, said means including a variable impedance tube connected between said screen grid and the negative side of said source of screen grid voltage.

20. In a direction finder amplifier system, the combination comprising a vacuum tube having a cathode impedance coupled to the grid of a succeeding tube, a source of voltage having one terminal connected to said cathode impedance, and a diode and an impedance connected in series between the other terminal of said source of voltage and the other terminal of said cathode impedance, said diode operating to produce the effect of a substantially linear grid voltage-plate current characteristic for said tubes.

21. In a direction finder amplifier system, the combination comprising a vacuum tube having a cathode impedance output circuit, a second vacuum tube having its grid connected to said cathode impedance to serve as a voltage control current relay, and means for reducing the voltage developed across said cathode impedance in excess of a predetermined value, said means including a source of voltage having one terminal connected to said cathode impedance, and a diode and an impedance connected in series between the other terminal of said source of voltage and the other terminal of said cathode impedance thereby to produce the over-all effect of a substantially linear grid voltage-plate current characteristic for said combined tubes.

22. A radio direction finder system comprising a plurality of directional antennas arranged in polar symmetry and a non-directional sense antenna, means for sequentially combining a signal energy from each of said directional antennas with energy from said non-directional sense antenna, a communication receiver having a detector, said receiver being energized with said combined signal energies, means for obtaining from said receiver detector sub-audible pulses having amplitudes proportional to the magnitudes of said combined antenna signal energies, a plurality of energy storage circuits connected to said instrument, an indicating instrument, and means for sequentially supplying said pulses to said circuits of said indicating instrument to produce a resultant indicative of the direction from which signal energies are being received.

23. A radio direction finding system comprising a non-directional sense antenna and at least three directional antennas arranged in polar symmetry so said directional antennas have no resultant response to horizontally polarized signal components, means periodically conductive at intervals for sequentially combining energy from said directional antennas with said sense antenna, means for producing pulses having amplitudes proportional to the magnitudes of said directional antenna signal energies, an indicating instrument having a plurality of energizing windings corresponding in number to the number of directional antennas, energy storage means for said windings and means for sequentially supplying said energy storage means with said pulses for intervals of shorter duration than the times of combining energy from said directional antennas with energy from said non-directional sense antenna.

24. A radio direction finding system comprising a plurality of directional antennas arranged in polar symmetry and a non-directional sense antenna, means for sequentially combining signal energy from each of said first antennas with energy from said sense antenna, means for maintaining the magnitude of the energy obtained from said directional antennas less than the magnitude of the energy obtained from said sense antenna, means for producing from said combined energies pulses having amplitudes corresponding to the magnitudes of said directional antenna energies, an indicating instrument, and means for supplying said pulses to said indicating instrument to produce an indication of the direction from which signal energies are being received.

25. A radio direction finding system comprising a non-directional sense antenna and a plurality of directional antennas arranged in polar symmetry, an amplifier connected to each of said antennas, a crystal rectifier interposed between each of said directional antennas and said amplifier, a source of direct current potential, and means for sequentially applying said source of direct current potential to said crystal rectifier to reduce the impedance thereof, and means connected to said amplifier arranged to be responsive to the magnitudes of the energies supplied to said amplifier by said antennas.

26. In a direction finding system, the combination comprising a plurality of directional antennas and a non-directional sense antenna, means for sequentially combining energy from each directional antenna with energy from said sense antenna, means for producing pulses proportional to the magnitudes of the directional antenna energies, an amplifier for said pulses, said amplifier having a certain phase-shift characteristic, a polyphase indicating instrument energized from said amplifier, said instrument having a movable element, and an indicating pointer mounted on said movable element in a position displaced from normal to compensate for said phase-shift thereby to produce an accurate indication of the direction from which radio signals are being received.

27. A direction finding system comprising a plurality of directional antennas and a non-directional sense antenna, means for sequentially combining energy from each directional antenna with energy from said sense antenna, means for producing pulses proportional to the magnitudes of the directional antenna energies, a polyphase indicating instrument having a plurality of windings corresponding in number to the number of said directional antennas, an amplifier tube for each winding, a cathode bias resistor for each tube and a common cathode bias resistor for all of said tubes, and means for sequentially supplying said pulses to said tubes.

28. In a direction finder system the combination comprising a plurality of directional antennas and a sense antenna, means for sequentially combining energy from each directional antenna with energy from said sense antenna, means for producing pulses proportional to the magnitudes of said directional antenna energies, a polyphase indicating instrument having a plurality of windings corresponding in number to the number of said directional antennas, an amplifier tube for each winding, an impedance connected to the anode of each of said tubes, one of said impedances being fixed and the remaining impedances being variable, and a switch associated with each tube having a variable impedance whereby the anode current flow of said tube may be stopped to provide a no-signal reference indication for adjusting the impedance of each other tube to obtain a similar output characteristic.

29. In a radio direction finder, the combination comprising a plurality of directional antennas and a sense antenna, means for sequentially combining the signal energy of each directional antenna with that of said sense antenna, means including a detector energized by said combined signal energies, means for producing from the output of said detector low frequency pulses having amplitudes proportional to the magnitudes of said directional antenna signal energies, a polyphase indicating system including a plurality of tubes corresponding in number to the number of directional antennas and energized by said pulses in a sequence corresponding to the sequence of combining said antenna energies, an instrument energized by said plurality of tubes, an energy storage circuit connected to the input circuit of each of said tubes, each of said energy storage circuits having a time constant within the range from one-half to ten times the time constant of said means for sequentially combining said antenna signal energies.

30. A radio direction finding system comprising a plurality of directional antennas arranged in polar symmetry and a non-directional sense antenna, means for combining energy from said directional antennas and said non-directional sense antenna, a source of direct current potential and a plurality of diodes each associated with a different one of said directional antennas and arranged to be rendered conductive by application of said direct current potential thereto, said diodes each being connected to said energy combining means, and means responsive to energy from said antennas for indicating the direction from which signal energies are being received.

31. In a radio direction finder an amplifier for pulses proportional to the magnitudes of directional antenna energies, said amplifier having a certain phase-shift characteristic, an indicating instrument energized from said amplifier and having a movable element, and an indicating pointer mounted on said movable element in a position displaced from normal to compensate for said phase-shift, thereby to produce an accurate indication.

32. In a tri-coordinate direction finder system, means for producing a plurality of pulses, an amplifier for said pulses, including a plurality of stages for limiting the amplitude of the pulses to a predetermined value, to eliminate the effects of transient disturbances or noise impulses, each stage including a vacuum tube having means connected to the grid of said tube for limiting the rise of grid voltage above a predetermined value, one of said stages having means for maintaining substantially constant the cathode bias voltage.

33. In a radio direction finder, the combination comprising a plurality of directional antennas and a non-directional antenna, means for sequentially combining the energy of each directional antenna with that of said non-directional antenna, and an amplifier energized by said combined signal energies, an auxiliary amplifier interposed between said directional antennas and said amplifier, means for producing from said first amplifier low frequency pulses having amplitudes proportional to the magnitudes of the directional antenna signal energies, an indicating system including a plurality of tubes corresponding in number to the number of directional antennas and energized by said pulses in sequence, and means for developing from the most negative voltage appearing across the cathode resistors of said tubes, an automatic volume control voltage for controlling the gain of said auxiliary amplifier.

34. In a direction finder, a multi-stage amplifier, a diode connected in an alternating current circuit between successive stages thereof, a bridge circuit including a plurality of impedances, one of which is variable in accordance with the output of said amplifier, and means connecting said diode in a direct current circuit across one diagonal of said bridge circuit.

35. In a direction finder, a multi-stage amplifier, a diode connected in an alternating current circuit between successive stages of said amplifier, a bridge circuit including a plurality of impedances, one of which is variable in accordance with the output of said amplifier, means connecting said diode in a direct current circuit across one diagonal of said bridge circuit, and a source of direct current potential connected across the other diagonal of said bridge circuit.

36. In a multi-coordinate direction finder system, means for producing a plurality of direction finder pulses, an amplifier for said pulses having a grid circuit containing a series current limiting resistor whereby anode-current cut-off is obtained by peaks in excess of a predetermined value thereby to limit peaks of one polarity, a second amplifier connected to said first amplifier, and means for limiting peaks of the opposite polarity including a grid circuit containing a diode connected to ground.

KENNETH W. JARVIS.

REFERENCES CITED

The following references are of record in the file of this patent:

UNITED STATES PATENTS

| Number | Name | Date |
|---|---|---|
| 1,842,342 | Eaton | Jan. 19, 1932 |
| 2,026,254 | Sandfort | Dec. 31, 1935 |
| 2,107,633 | Hooven | Feb. 8, 1938 |
| 2,222,933 | Blumlein | Nov. 26, 1940 |
| 2,266,038 | Hinman | Dec. 16, 1941 |
| 2,338,412 | Dallos | Jan. 4, 1944 |
| 2,383,420 | Scoles | Aug. 21, 1945 |
| 2,392,420 | Steinhoff | Jan. 8, 1946 |
| 2,422,072 | Blodgett | June 10, 1947 |
| 2,434,929 | Holland et al. | Jan. 27, 1948 |
| 2,449,517 | Stout et al. | Sept. 14, 1948 |

FOREIGN PATENTS

| Number | Country | Date |
|---|---|---|
| 873,067 | France | Mar. 2, 1942 |